United States Patent
Jamadagni et al.

(10) Patent No.: US 10,051,538 B2
(45) Date of Patent: Aug. 14, 2018

(54) METHOD AND A SYSTEM FOR MANAGING CELL SELECTION IN A WIRELESS NETWORK SYSTEM

(71) Applicant: Samsung Electronics Co., Ltd., Suwon-si, Gyeonggi-do (KR)

(72) Inventors: Satish Nanjunda Swamy Jamadagni, Byrasandra (IN); Himke Van Der Velde, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 65 days.

(21) Appl. No.: 14/349,509

(22) PCT Filed: Oct. 4, 2012

(86) PCT No.: PCT/KR2012/008054
§ 371 (c)(1),
(2) Date: Apr. 3, 2014

(87) PCT Pub. No.: WO2013/051871
PCT Pub. Date: Apr. 11, 2013

(65) Prior Publication Data
US 2014/0247717 A1     Sep. 4, 2014

(30) Foreign Application Priority Data
Oct. 4, 2011 (IN) .......................... 3443/CHE/2011

(51) Int. Cl.
*H04W 36/22* (2009.01)
*H04W 4/06* (2009.01)
(Continued)

(52) U.S. Cl.
CPC ............. *H04W 36/22* (2013.01); *H04W 4/06* (2013.01); *H04W 36/04* (2013.01); *H04W 48/20* (2013.01); *H04W 48/12* (2013.01); *H04W 84/042* (2013.01)

(58) Field of Classification Search
CPC .. H04J 11/0086; H04L 5/0064; H04L 5/0091; H04L 5/189; H04W 16/24;
(Continued)

(56) References Cited

U.S. PATENT DOCUMENTS

2005/0090278 A1* 4/2005 Jeong ................ H04W 36/0055
455/525
2005/0245260 A1* 11/2005 Nielsen ................ H04W 48/20
455/435.1
(Continued)

OTHER PUBLICATIONS

Huawei, Summary of Email Discussion[74#34]-LTE:Rel-11 MBMS, 3GPP TSG RAN WG2 #75, R2-114407, Aug. 16, 2011, Athens, Greece.
(Continued)

*Primary Examiner* — Marsha D. Banks Harold
*Assistant Examiner* — Dharmesh Patel
(74) *Attorney, Agent, or Firm* — Jefferson IP Law, LLP

(57) ABSTRACT

A method of managing cell reselection for a User Equipment (UE) in an idle mode connected to a wireless network system is provided. The method includes determining system information of available cells on a given frequency, determining the system information from a plurality of cells and frequencies to determine which of the plurality of cells support a Multimedia Broadcast Multicast Service (MBMS), determining a MBMS Control CHannel (MCCH) of the plurality of cells that support the MBMS, generating a list of cells by prioritizing the plurality of cells that support the MBMS over other frequencies or cells in a ranking order, and reselecting a cell or a frequency supporting the MBMS
(Continued)

before starting a MBMS session from among the generated list to be a cell where the MBMS session is provided.

18 Claims, 13 Drawing Sheets

(51) Int. Cl.
*H04W 48/20* (2009.01)
*H04W 36/04* (2009.01)
*H04W 84/04* (2009.01)
*H04W 48/12* (2009.01)

(58) Field of Classification Search
CPC ..... H04W 36/14; H04W 36/18; H04W 36/24; H04W 36/0055; H04W 36/0061; H04W 36/0083; H04W 48/12; H04W 48/20; H04W 72/005; H04W 72/042; H04W 74/0833; H04W 76/064
See application file for complete search history.

(56) References Cited

U.S. PATENT DOCUMENTS

| | | | |
|---|---|---|---|
| 2008/0227453 A1* | 9/2008 | Somasundaram | H04W 48/20 455/436 |
| 2008/0287129 A1* | 11/2008 | Somasundaram | H04W 36/0055 455/436 |
| 2009/0239535 A1* | 9/2009 | Chun | H04J 11/0069 455/435.2 |
| 2010/0167746 A1 | 7/2010 | Lee et al. | |
| 2010/0222055 A1 | 9/2010 | Cho et al. | |
| 2011/0053490 A1* | 3/2011 | Wu | H04W 72/005 455/3.01 |
| 2011/0141908 A1* | 6/2011 | Ishida | H04W 48/02 370/241 |
| 2011/0230220 A1 | 9/2011 | Chen | |
| 2011/0305183 A1* | 12/2011 | Hsu | H04W 72/005 370/312 |

OTHER PUBLICATIONS

Samsung, MBMS enhancements for REL-11, General, 3GPP TSG RAN2 #75, R2-114220, Aug. 16, 2011, Athens, Greece.
Huawei, [76#38]-LTE:MBMS Assistance information, 3GPP TSG RAN WG2 #77, R2-120513, Feb. 1, 2012, Dresden, Germany.
Samsung, MBMS enhancements for REL-11, Idle, 3GPP TSG RAN2 #75, R2-114221, Aug. 16, 2011.
Qualcomm Europe, Frequency Layer Convergence scenarios, 3GPP TSG RAN2 #42, R2-041058, May 17, 2004, Montreal, Canada.

* cited by examiner

METHOD AND A SYSTEM FOR MANAGING CELL SELECTION IN A WIRELESS NETWORK SYSTEM

CROSS-REFERENCE TO RELATED APPLICATION(S)

This application is a U.S. National Stage application under 35 U.S.C. § 371 of an International application filed on Oct. 4, 2012 and assigned application number PCT/KR2012/008054, which claimed the benefit of a Indian patent application filed on Oct. 4, 2011 in the Indian Intellectual Property Office and assigned Serial number 3443/CHE/2011, the entire disclosure of which is hereby incorporated by reference.

TECHNICAL FIELD

The present disclosure relates to mobile communication technology. More particularly, the present disclosure relates to management of cell selection of user equipment connected to a wireless network, such as a Long Term Evolution (LTE) type of network.

BACKGROUND ART

A user equipment may be in an active mode or in an idle mode. The active mode of the user equipment may correspond to active data transferring between the user equipment and a base station. The idle mode of the user equipment may correspond to passive and/or inactive data transferring between the user equipment and the base station.

For example, when the user equipment is in the idle mode and in need of a Multimedia Broadcast Multicast Service (MBMS), the user equipment will latch on to, or in other words, connect to and/or communicate with, a cell that provides MBMS services. When a user equipment is in the idle mode and is receiving the MBMS service, the user equipment may enter into an active mode at any time thereby causing a load on the cell as the data transfer rate and/or bit rate may be relatively high owing to the nature of applications being handled in the user equipment. In a Long Term Evolution (LTE) cell supporting carrier aggregation, there may be multiple bands, each band with multiple carriers, to facilitate uplink and downlink of data between the user equipment and the base station. Among the bands supported by an LTE cell, there may be selective bands that accommodate MBMS service in a cell. Hence, when in idle mode, the user equipment may try to connect onto the selective bands and/or band and/or a particular cell that supports such a band that has MBMS capability. When a large number of mobile communication devices, such as user equipment, latch on to a cell in an idle mode, there is a high probability that they may enter the connected mode in the same cell. When the user equipment above a limit tries to connect to the selective bands with MBMS capability, congestion may occur. In the scenario when the MBMS transmissions are scheduled in only one band or cell, the idle mode UEs that may receive MBMS service may camp onto the cell or frequency that supports MBMS services.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of managing mobile communication technology.

More User Equipments (UEs) may be camped onto a cell or frequency that supports Multimedia Broadcast Multicast Service (MBMS) rather than cells that do not support MBMS services. Such scenarios lead to congestion of certain cells/frequencies than others. In order to mitigate such overload conditions, there is a need to enforce appropriate camping behaviors as well as make sure that proper convergence and dispersion mechanism are in place in Carrier Aggregated Long Term Evolution (LTE) networks supporting MBMS.

In accordance with an embodiment of the present disclosure, a method of managing cell reselection for a User Equipment (UE) in an idle mode connected to a wireless network system is provided. The method includes determining system information of available cells on a given frequency, determining the system information from a plurality of cells and frequencies to determine which of the plurality of cells support MBMS, determining a MBMS Control Channel (MCCH) of cells that support the MBMS, generating a list of cells by prioritizing the plurality of cells that support the MBMS over other frequencies or cells in a ranking order, and reselecting a cell or a frequency supporting the MBMS before starting a MBMS session from among the generated list to be a cell wherein the MBMS session is provided.

In accordance with another embodiment of the present disclosure, an apparatus is provided. The apparatus includes a processor, a memory connected to the processor, the memory including a cell reselection management module, wherein the cell reselection management module is configured to determine system information of available cells on a given frequency, determine the system information from a plurality of cells and frequencies to determine which of the plurality of cells support a MBMS, determine a MCCH of the plurality of cells that support the MBMS, generate a list of cells by prioritizing the plurality of cells that support the MBMS over other frequencies or cells in a ranking order, and reselect a cell or a frequency supporting the MBMS before starting a MBMS session from among the generated list to be a cell where the MBMS session is provided.

In order to address the above problems, this present disclosure discusses idle mode specific aspects related to MBMS service continuity, in particular this present disclosure covers aspects covering the issue of convergence, dispersion and prioritization of cells when the user equipments are in idle mode.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, description of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
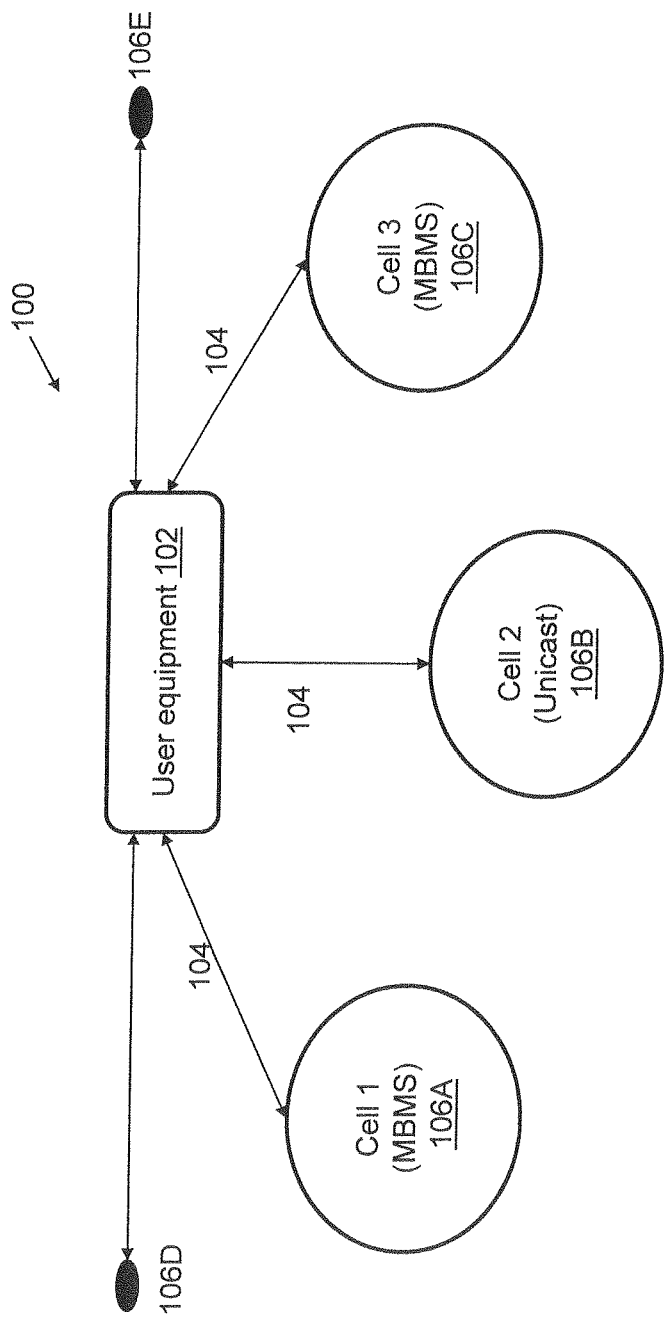
FIG. 1 illustrates a block diagram of a network system according to an embodiment of the present disclosure.

FIG. 1 illustrates a block diagram of a network system according to an embodiment of the present disclosure.

A network system 100 includes a User Equipment (UE) 102 that is capable of approaching more than one of cells 106A, 106B, 106C, 106D, and 106E, which may also be referred to as evolved Node Bs (eNBs) 106A, 106B, 106C, 106D, and 106E, to obtain a Multimedia Broadcast Multicast Service (MBMS). For example, the network system 100 can be a Long Term Evolution (LTE) network. The UE 102 establishes an idle mode data transfer link to at least one of the cells 106A, 106B, and 106C, through at least one of a network connection 104. More preferably, the network connection 104 is a wireless network happening between cell and a mobile communication device, such as the UE 102. It is to be noted that not all of the eNBs 106A, 106B, 106C, 106D, and 106E, are capable of providing MBMS in a LTE network.

Figure 2:
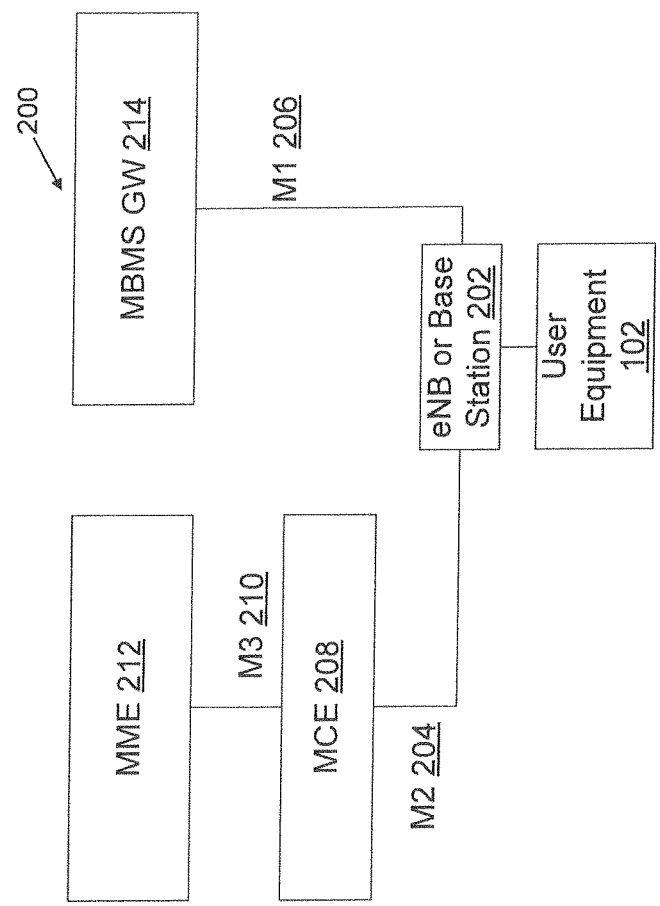
FIG. 2 illustrates a Multimedia Broadcast in Single Frequency Network (MBSFN), an extension of a Long Term Evolution (LTE) network system according to an embodiment of the present disclosure.

FIG. 2 illustrates a Multimedia Broadcast in Single Frequency Network (MBSFN), an extension of a LTE network system according to an embodiment of the present disclosure.

A MBSFN 200 has a network architecture that provides a MBMS session over a single frequency in a network system such as the LTE network system. The MBFSN 200 includes an eNB 202, which may also be referred to as, or be, a cell 202 or a base station 202, a LTE internal control plane interface, which is referred to as M2 204, a user plane interface, which is referred to as M1 206, a Multicast Coordination Entity (MCE) 208, a control plane interface between a LTE network and an Evolved Packet Core (EPC), which is referred to as M3 210, a Mobility Management Entity (MME) 212, and a MBMS Gateway 214.

The above mentioned terms are standard terminology used in an LTE type of network system and is known to the person skilled in the art.

Figure 3:
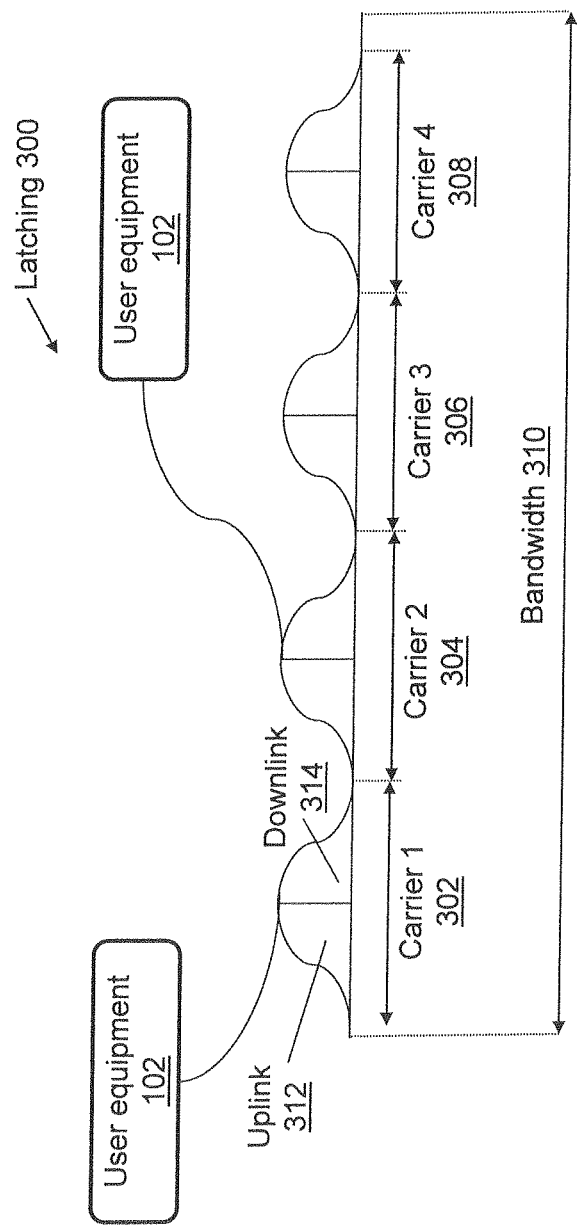
FIG. 3 illustrates User Equipments (UEs) latching on to a carrier in a LTE network system capable of providing Multimedia Broadcast Multicast Service (MBMS) according to an embodiment of the present disclosure.

FIG. 3 illustrates UEs latching on to a carrier in a LTE network system capable of providing Multimedia Broadcast Multicast Service (MBMS) according to an embodiment of the present disclosure.

Latching 300 is performed by the UE 102 at a carrier 302 in accordance with an embodiment of the present disclosure. The carrier 302 includes an uplink 312, and a downlink 314. The combination of a plurality of carriers, including the carrier 302 and carriers 304, 306, and 308, may form bandwidth 310. This combination of a number of carriers may also be referred to as carrier aggregation. In LTE networks, carrier aggregation allows expansion of effective bandwidth delivered to a user terminal through concurrent utilization of radio resources across multiple carriers. Multiple component carriers are aggregated to form a larger overall transmission bandwidth, such as the bandwidth 310. For example, two or more component carriers can be aggregated to support wider transmission bandwidths up to 100 MHz. In an embodiment of the present disclosure, in LTE networks, when carrier aggregation is enabled there is a possibility of MBMS being deployed on at least one supported band.

Figure 4:
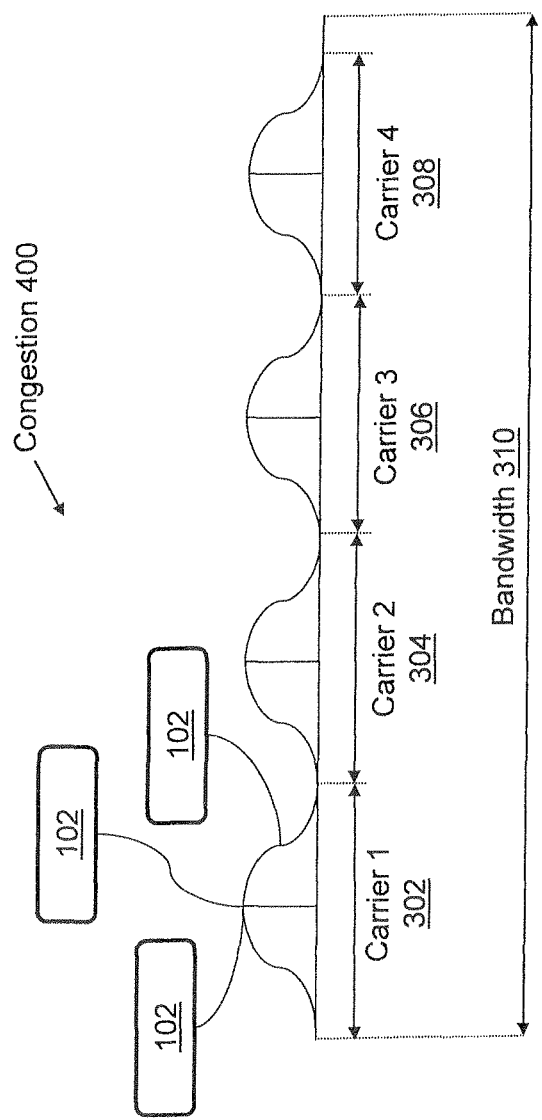
FIG. 4 illustrates congestion of a plurality of UEs using MBMS provided via a carrier in a LTE network system according to an embodiment of the present disclosure.

FIG. 4 illustrates congestion of a plurality of UEs using MBMS provided via a carrier in a LTE network system, in accordance with an embodiment of the present disclosure.

When at least one UE 102, such as a plurality of UEs 102 as shown in FIG. 4, try to latch on to a carrier, such as the carrier 302, a congestion 400 may occur. For example, the congestion 400 may imply that a number of UEs 102 that can be accommodated within the carrier is exceeded.

For example, when the MBMS transmissions are scheduled in only one bandwidth or a cell, the UEs 102 that are in the idle mode and that would like to receive the MBMS service would like to camp onto the cell and/or frequency that supports MBMS services. This can lead to more UEs being camped onto a cell and/or frequency that supports MBMS rather than the UEs being camped onto cells that do not support MBMS. Such scenarios may lead to congestion of certain cells and/or frequencies with respect to other cells and/or frequencies.

Figure 5A:
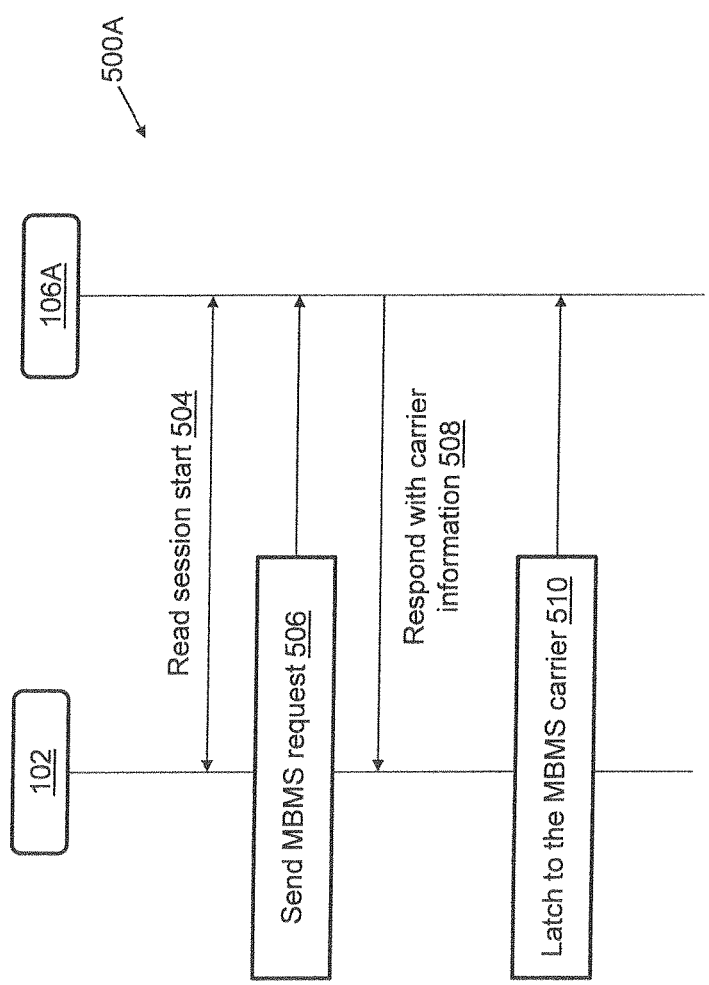
FIG. 5A illustrates a method of latching on to a cell or an evolved Node B (eNB) in a LTE network system according to an embodiment of the present disclosure.

FIG. 5A illustrates a method of latching on to a cell or eNB in a LTE network system according to an embodiment of the present disclosure.

A latching method 500A denotes latching of the UE 102 to the eNB 106A according to an embodiment of the present disclosure. A session of Multimedia Broadcast Multicast Service (MBMS), or in other words, a read session is started at operation 504. The UE 102 sends a MBMS request to access the MBMS session in the eNB 106A at operation 506. The eNB 106A responds, at operation 508, with carrier information where the MBMS session is provided in the bandwidth spectrum to the UE 102. The user equipment 102, after operation 508, latches on to a MBMS carrier of the eNB 106 to access the MBMS session.

Figure 5B:
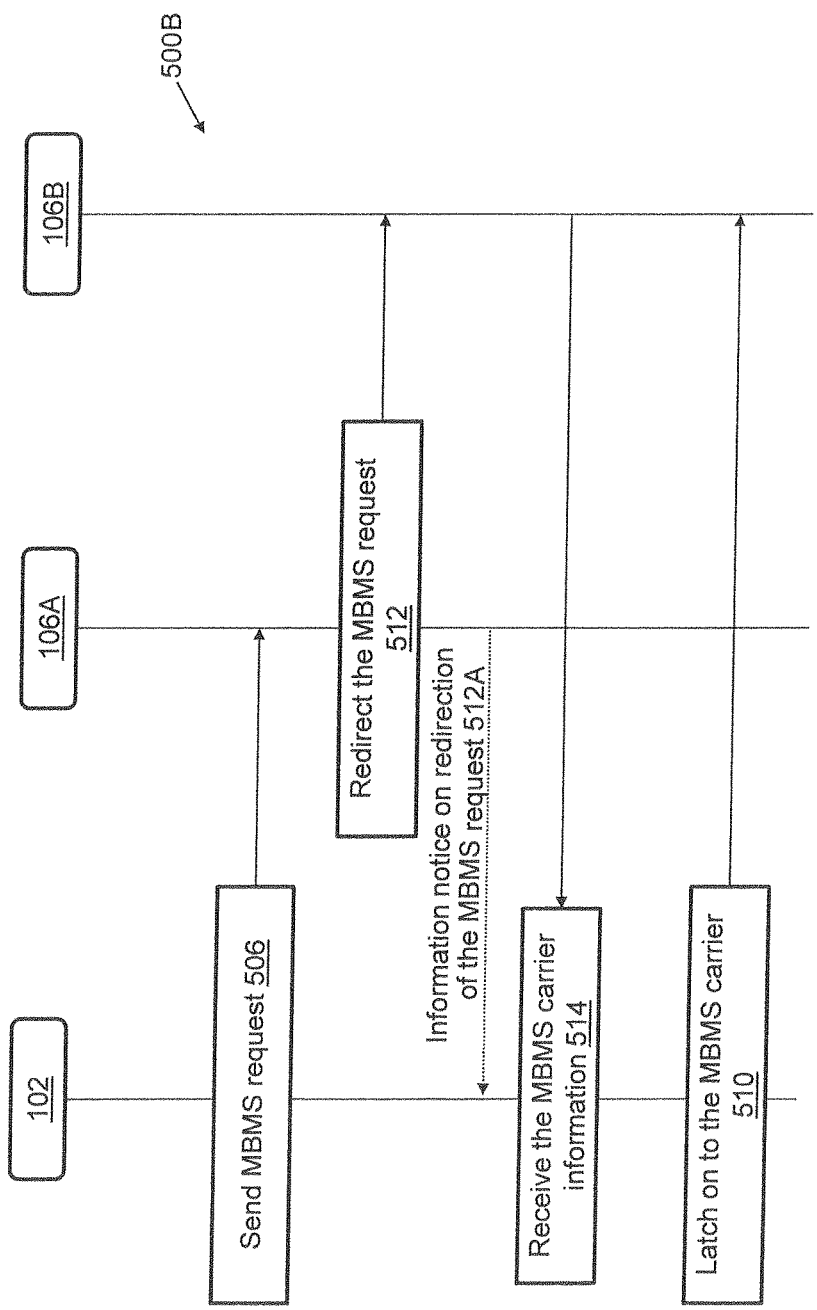
FIG. 5B illustrates a method of latching on to a cell or an eNB in a LTE network system according to an embodiment of the present disclosure.

FIG. 5B illustrates another method of latching on to a cell or an eNB in a LTE network system according to an embodiment of the present disclosure.

Another latching method 500B illustrates the UE 102 latching on to the eNB 106A according to an embodiment of the present disclosure. The UE 102 sends a MBMS request for accessing a MBMS session to the eNB 106A at operation 506. The eNB 106A redirects the MBMS request to the eNB 106B, which is included in the LTE network system, at operation 512. The redirection of the MBMS request may be performed owing to unavailability of MBMS or incompatibility at the eNB 106B. At operation 512A, an information notice, or in other words, a notification, on redirection of the MBMS request may be sent to the UE 102. The eNB 106B sends carrier information such that the UE 102 receives the MBMS carrier information at operation 514. The UE 102 latches on to the MBMS carrier, as provided by the eNB 106B, to access the MBMS session in operation 510.

Figure 5C:
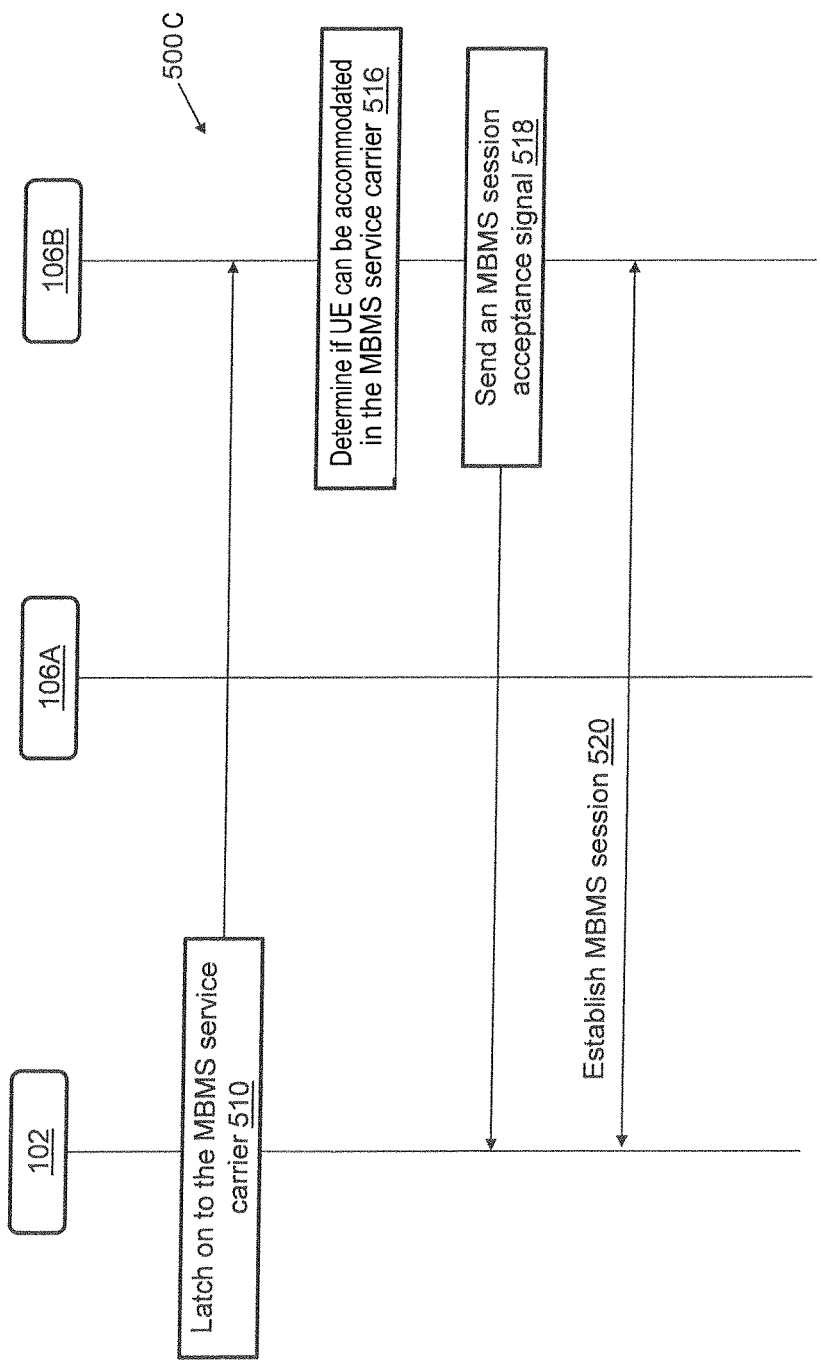
FIG. 5C illustrates a method of establishing a MBMS session with a cell or an eNB in a LTE network system according to an embodiment of the present disclosure.

FIG. 5C illustrates a method of establishing a MBMS session with a cell or an eNB in a LTE network system according to an embodiment of the present disclosure.

A MBMS session establishment method 500C denotes establishment of a MBMS session between the UE 102 and the eNB 106B in an embodiment of the present disclosure. The UE 102 latches on to a MBMS service carrier of the eNB 106B at operation 510. At operation 516, the eNB 106B determines whether the UE can be accommodated on the MBMS service carrier, or in other words, determines whether the eNB 106B will be able to accommodate the UE 102. If the eNB 106B can accommodate the UE 102, then a MBMS session acceptance signal is sent to the UE 102 at operation 518. The MBMS session is established at operation 520.

Figure 5D:
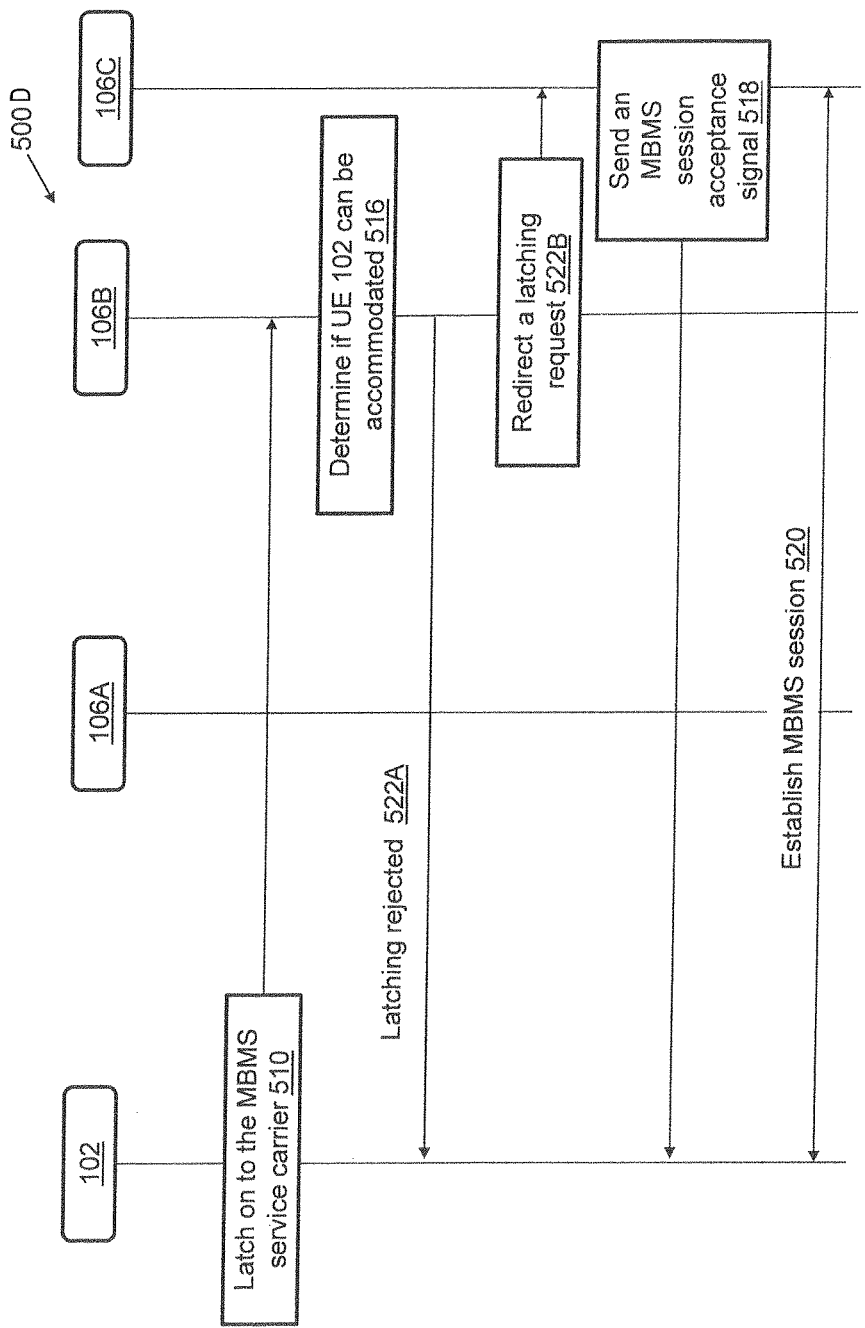
FIG. 5D illustrates a method of establishing a MBMS session with a cell or an eNB in a LTE network system according to an embodiment of the present disclosure.

FIG. 5D illustrates another method of establishing MBMS session with a cell or an eNB in a LTE network system according to an embodiment of the present disclosure.

Another MBMS session establishment method 500D illustrates establishing a MBMS session between the UE 102 and the eNB 106C. At operation 510, the UE 102 latches on to a MBMS service carrier of the eNB 106B. At operation 516, the eNB 106B determines if the eNB 106B can accommodate the UE 102 using the MBMS service carrier hosting the MBMS session. A latching rejected notification is sent to the user equipment 102 at operation 522A. Thereafter, at operation 522B, a latching request, to access MBMS session and sent from the UE 102, is redirected to the eNB 106C. At operation 518, a MBMS session acceptance signal is sent to the UE 102 from the eNB 106C. At operation 520, a MBMS session is established between the UE 102 and the eNB 106C.

Figure 5E:
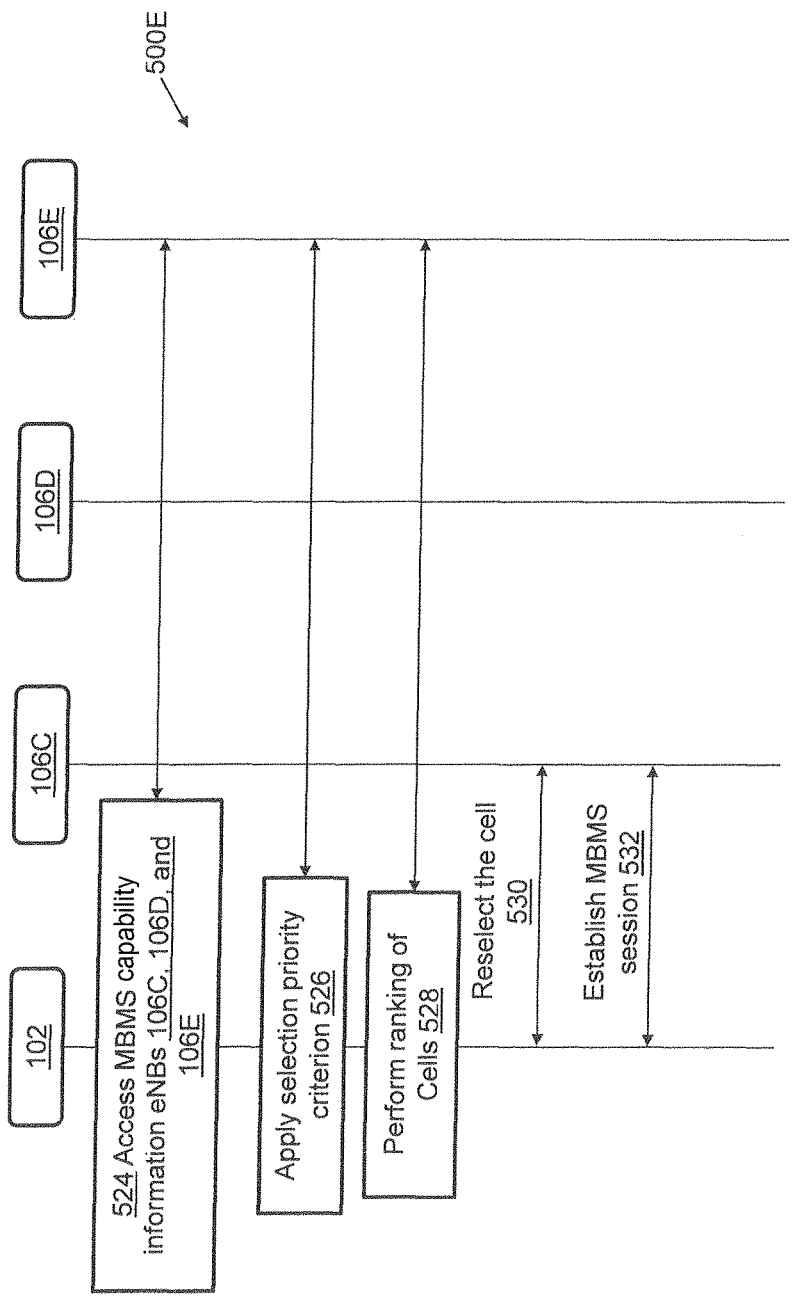
FIG. 5E illustrates a method of prioritizing and selecting a cell or an eNB in a LTE network system according to an embodiment of the present disclosure.

FIG. 5E illustrates a method of prioritizing and selecting a cell or an eNB in a LTE network system according to an embodiment of the present disclosure.

At operation 524, the UE 102 accesses MBMS capability information of the eNBs 106C, 106D, and 106E, which are included in the LTE network system. At operation 526, a selection priority criterion is applied to the eNBs 106C, 106D, and 106E. At operation 528, a ranking of cells, which respectively corresponding to the eNBs 106C, 106D, and 106E, is performed based on an outcome of applying the selection priority criterion in operation 526. Thereafter, at operation 530, at least one eNB with a highest rank, from among at least one of the eNBs 106C, 106D, and 106E, is reselected, or in other words, a cell is reselected in operation 530. In operation 532, a MBMS session is established between the UE 102 and the eNB having the highest rank from among the eNBs 106C, 106D, and 106E, for example the eNB 106C.

According to an embodiment of the present disclosure, the UE 102 trying to establish a MBMS session may randomly select a target cell or eNB, from among the eNBs 106A, 106B, 106C, 106D, and 106E. However, during such a random selection, the selected eNB may not have a MBMS session capability. Then, the UE 102 performs random reselection again to find a suitable eNB.

Figure 5F:
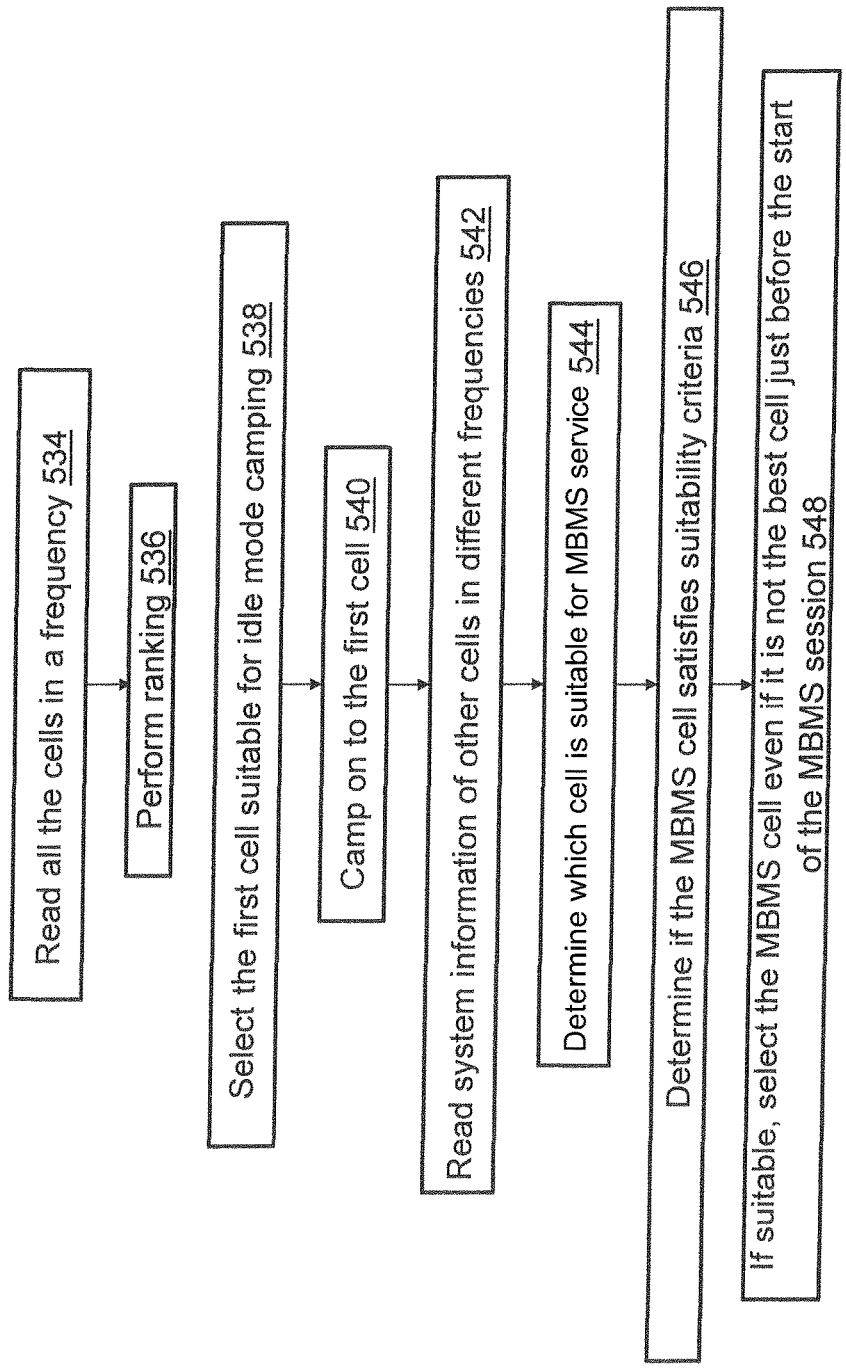
FIG. 5F is a flow chart illustrating a method of cell selection management according to an embodiment of the present disclosure.

FIG. 5F is a flow chart illustrating a method of cell selection management according to an embodiment of the present disclosure.

At operation 534, the UE 102 reads, or in other words, determines, all the cells in a frequency. At operation 536, a ranking is performed on the cells to determine a first cell for latching or camping. At operation 538, the UE 102 selects the first cell suitable for idle mode camping on a given frequency upon determining the first cell to be a highest ranked cell. At operation 540, the UE 102 camps on to the first cell. At operation 542, the UE 102 reads, or in other words, determines, the system information of other cells in different frequencies to know if the other cells in the other frequencies support MBMS service. At operation 544, the UE 102 determines which cell, from among the other cells of operation 542, is suitable for MBMS service. The UE 102 for example, determines the information about which frequency supports the MBMS service, and in one example, the UE 102 determines the information about which frequency supports the MBMS service through the electronic program guide that could be made available to the UE 102 during the "service announcement" phase and/or procedure. At operation 546, the UE 102 determines whether a second cell satisfies suitability criteria, or in other words and/or additionally, determine whether the second cell is providing the MBMS service better than the first cell. At operation 548, the UE 102 camps on to the second cell, or in other words, if suitable, the UE 102 selects the MBMS cell, even if the MBMS cell is not the best cell, just before the start of the MBMS session. The reselection performed in the operations above is done regardless of S search parameters and Qhyst parameters, at times. Here the Qhyst parameters may include a hysteresis value for ranking criteria. The Ssearch parameters may include SIntraSearchP, which specifies a Srxlev threshold (in dB) for intra-frequency measurements, SIntraSearchQ, which specifies a Squal threshold (in dB) for intra-frequency measurements, SnonIntraSearchP, which specifies the Srxlev threshold (in dB) for LTE inter-frequency and inter-RAT measurements, and SnonIntraSearchQ, which specifies the Squal threshold (in dB) for E-UTRAN inter-frequency and inter-RAT measurements. According to another embodiment, the reselection may be performed randomly to select a better cell.

Figure 5G:
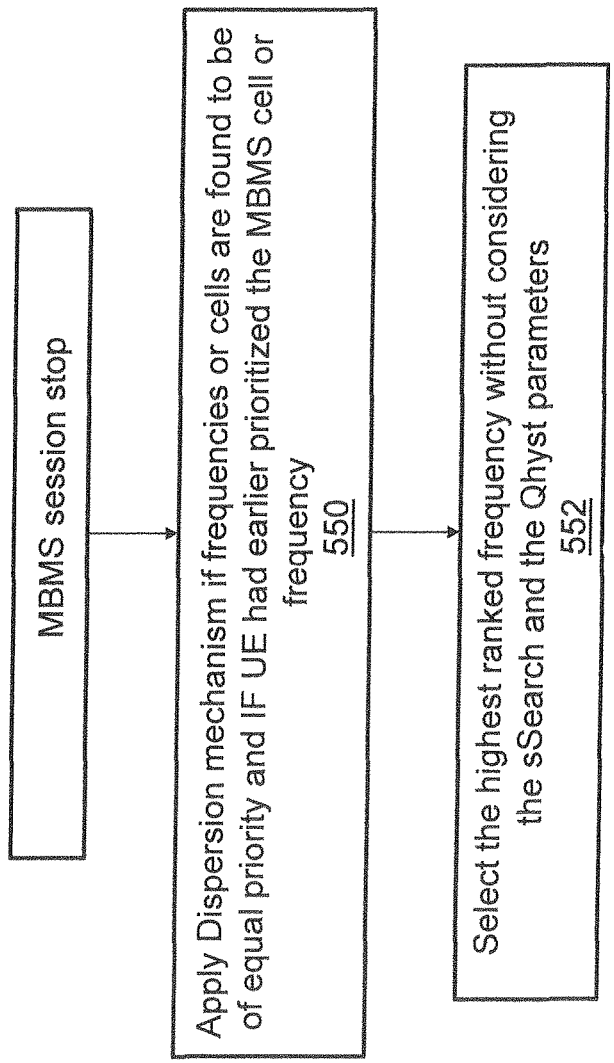
FIG. 5G is a flow chart illustrating a method of cell selection management according to an embodiment of the present disclosure.

FIG. 5G is a flow chart illustrating a method of cell selection management according to an embodiment of the present disclosure.

Upon the stop of a MBMS session, a dispersion mechanism is applied if frequencies or cells are found to be of equal priority and if a UE had earlier prioritized a MBMS cell or a frequency, at operation 550. At operation 552, a highest ranked frequency is selected without considering the sSearch parameters and the Qhyst parameters.

Figure 6:
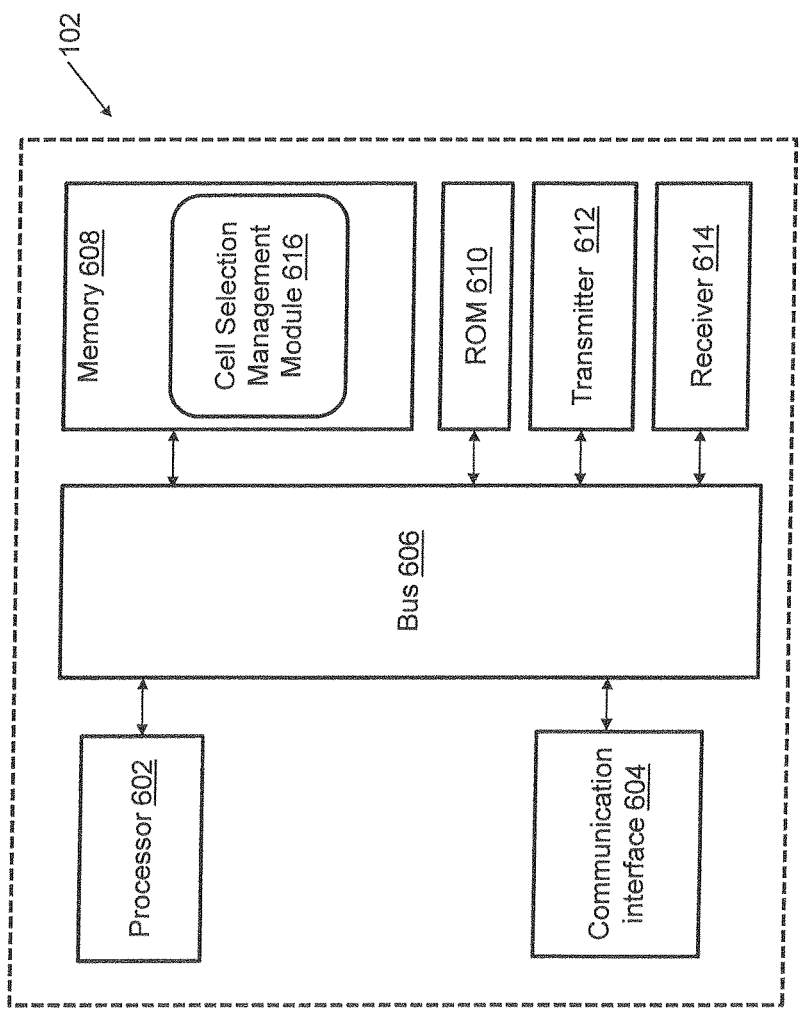
FIG. 6 illustrates an exploded view of a UE according to an embodiment of the present disclosure.

FIG. 6 illustrates an exploded view of a UE according to an embodiment of the present disclosure.

The UE 102 includes a processor 602, a communication interface 604, a bus 606, memory 608, a Read Only Memory (ROM) 610, a transmitter 612, and a receiver 614.

The processor 602, as used herein, may be any type of computational circuit, such as, but not limited to, a microprocessor, a microcontroller, a Complex Instruction Set Computing (CISC) microprocessor, a Reduced Instruction Set Computing (RISC) microprocessor, a Very Long Instruction Word (VLIW) microprocessor, an Explicitly Parallel Instruction Computing (EPIC) microprocessor, a graphics processor, a digital signal processor, or any other type of processing circuit and/or hardware element that may perform information processing. The processor 402 may also include embedded controllers, such as generic or programmable logic devices or arrays, application specific integrated circuits, single-chip computers, smart cards, and the like.

In an embodiment of the present disclosure, the memory 604 includes a cell selection management module 616 capable of performing all the operations performed in FIGS. 5A to 5E by the UE 102.

The memory 604 may be volatile memory and/or non-volatile memory. A variety of computer-readable storage media may be stored in and accessed from the memory elements. Memory elements may include any suitable memory devices for storing data and machine-readable instructions, such as a ROM, a Random Access Memory (RAM), an Erasable Programmable Read Only Memory (EPROM), an Electrically EPROM (EEPROM), a hard drive, a removable media drive for handling memory cards, Memory Sticks™, and the like.

Various embodiments of the present disclosure may be implemented in conjunction with modules, including functions, procedures, data structures, and application programs, for performing tasks, or defining abstract data types or low-level hardware contexts. Machine-readable instructions stored on any of the above-mentioned storage media may be executable by the processor 602.

Figure 7:
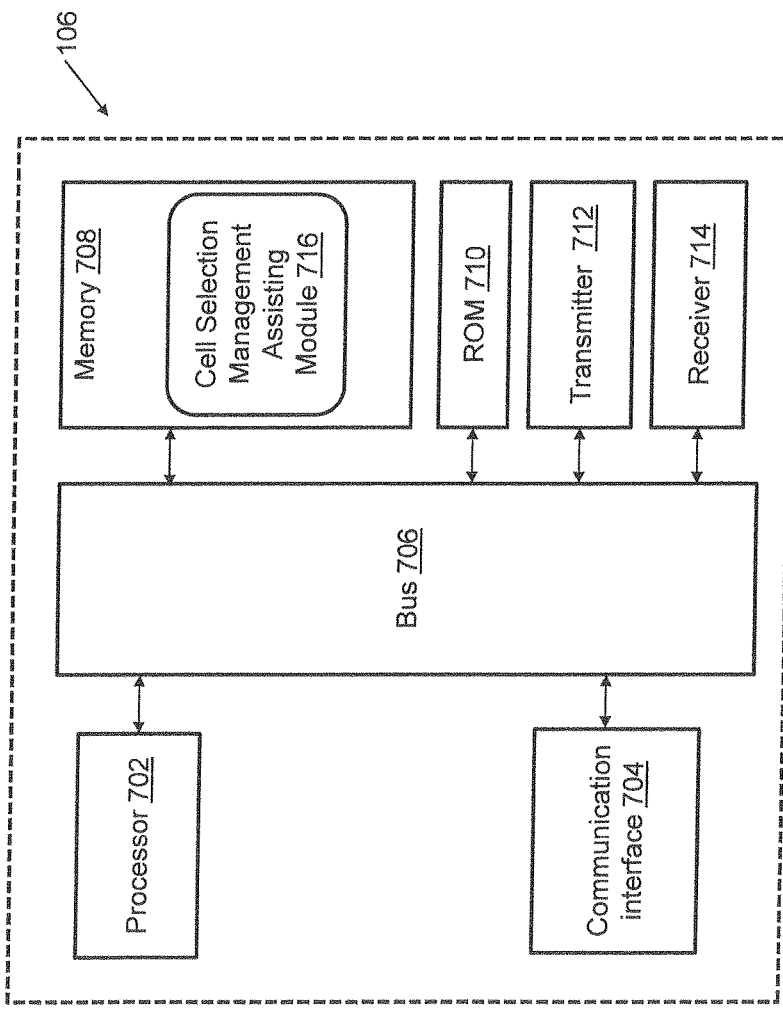
FIG. 7 illustrates an exploded view of an eNB according to an embodiment of the present disclosure.

FIG. 7 illustrates an exploded view of an eNB according to an embodiment of the present disclosure.

The eNB 106 includes a processor 702, a communication interface 704, a bus 706, a memory 708, a ROM 710, a transmitter 712, and a receiver 714.

The memory 708 includes the cell selection management assisting module 716, which is configured to work with the UE 102 to assist and/or facilitate in selection of an appropriate cell or eNB, such as the eNBs 106A, 106B, 106C, 106D, and 106E, in accordance with an embodiment of the present disclosure. Further, the eNB 106, according to an embodiment of the present disclosure is capable of performing all the operations at the eNB end as mentioned in the FIGS. 5A to 5E.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method of selecting a cell of a user equipment (UE) in a wireless network system, the method comprising:
   identifying cells supporting a multimedia broadcast multicast service (MBMS) based on system information of available cells on a predetermined frequency;
   applying a selection priority criterion to the identified cells supporting the MBMS;
   prioritizing the identified cells supporting the MBMS in a ranking order, over other cells that do not support the MBMS, based on an outcome of applying the selection priority criterion;
   selecting a first cell among the identified cells supporting the MBMS based on the prioritized ranking order before starting an MBMS session;
   transmitting, to a first evolved nodeB (eNB) related to the first cell, a first request for acquiring MBMS information;
   receiving, from the first eNB, an information notice for redirection of the first request to a second eNB related to a second cell;
   receiving, from the second eNB, the MBMS information related to the second cell, the first eNB being configured to redirect the first request to the second eNB;
   transmitting a second request for establishing an MBMS session with the second cell based on the MBMS information related to the second cell;
   receiving, from the second eNB, a latching rejection message, the second eNB being configured to redirect the second request to a third eNB related to a third cell based on congestion of the second cell; and
   establishing an MBMS session with the third cell.

2. The method of claim 1, further comprising identifying a carrier related to the third cell where the MBMS session is provided.

3. The method of claim 2, further comprising:
   latching on to the carrier related to the third cell where the MBMS session is provided.

4. The method of claim 1, further comprising:
   reselecting a fourth cell among the cells supporting the MBMS at completion of the MBMS session.

5. The method of claim 4, further comprising:
   reselecting the fourth cell based on one of a highest ranked cell and a cell selected by the UE, if multiple cells are of a same priority.

6. The method of claim 1, wherein the first cell is selected based on an electronic programming guide (EPG).

7. The method of claim 1, wherein the selection priority criterion is applied to the identified cells supporting the MBMS to determine which cell of the identified cells will provide the MBMS better than remainder cells of the identified cells.

8. The method of claim 1, wherein the third cell comprises an MBMS session capability.

9. An apparatus comprising:
   a processor; and
   a memory connected to the processor, the memory including a cell reselection management module, wherein the cell reselection management module is configured to:
- identify cells supporting a multimedia broadcast multicast service (MBMS), based on system information of available cells on a predetermined frequency,
- apply a selection priority criterion to the identified cells supporting the MBMS,
- prioritize the identified cells supporting the MBMS in a ranking order, over other cells that do not support the MBMS, based on an outcome of applying the selection priority criterion,
- select a first cell among the identified cells supporting the MBMS based on the prioritized ranking order before starting an MBMS session,
- transmit, to a first evolved nodeB (eNB) related to the first cell, a first request for acquiring MBMS information,
- receive, from the first eNB, an information notice for redirection of the first request to a second eNB related to a second cell,
- receive, from the second eNB, the MBMS information related to the second cell, the first eNB being configured to redirect the first request to the second eNB,
- transmit a second request for establishing the MBMS session with the second cell based on the MBMS information related to the second cell,
- receive, from the second eNB, a latching rejection message, the second eNB being configured to redirect the second request to a third eNB related to a third cell based on congestion of the second cell, and
- establish an MBMS session with the third cell.

10. The apparatus of claim 9, wherein the cell reselection management module is further configured to identify a carrier related to the third cell where the MBMS session is provided.

11. The apparatus of claim 10, wherein the cell reselection management module is further configured to latch on to the carrier related to the third cell where the MBMS session is provided.

12. The apparatus of claim 9, wherein the cell reselection management module is further configured to reselect a fourth cell among the cells supporting the MBMS at completion of the MBMS session.

13. The apparatus of claim 12, wherein the cell reselection management module is further configured to reselect the fourth cell based on one of a highest ranked cell and a cell selected by a user equipment (UE), if multiple cells are of a same priority.

14. The apparatus of claim 9, wherein the cell reselection management module is further configured to select the first cell based on an electronic programming guide (EPG).

15. The apparatus of claim 9, wherein the third cell comprises an MBMS session capability.

16. A method of selecting a cell of a user equipment (UE) by a first evolved nodeB (eNB) in a wireless network system, the method comprising:
- initiating, by the first eNB, a multimedia broadcast multicast service (MBMS) session between the UE and the first eNB;
- receiving, by the first eNB, an MBMS request, to acquire MBMS information;
- determining, by the first eNB, to redirect the MBMS request to a second eNB based on congestion of the first eNB;
- redirecting, by the first eNB, the MBMS request to the second eNB in order for the second eNB to transmit, to the UE, MBMS information related to the second eNB; and
- transmitting, by the first eNB, to the UE, an information notice based on the redirection of the MBMS request.

17. The method of claim 16, further comprising:
- receiving, by the first eNB, from the UE, a latching request for establishing an MBMS session between the UE and the first eNB based on the redirection of the MBMS request;
- transmitting, by the first eNB, to the UE, a latching rejection message; and
- redirecting, by the first eNB, to a third eNB, the latching request based on congestion of the first eNB, in order for the third eNB to establish an MBMS session between the UE and the third eNB.

18. The method of claim 17,
wherein the UE latches on to the MBMS carrier of the third eNB.

* * * * *